Sept. 6, 1960

R. L. MANEVAL 2,951,738

RECORDING APPARATUS

Filed Sept. 16, 1959

INVENTOR.
RICHARD L. MANEVAL,
BY
ATTORNEY.

Sept. 6, 1960
R. L. MANEVAL
2,951,738
RECORDING APPARATUS
Filed Sept. 16, 1959
2 Sheets-Sheet 2
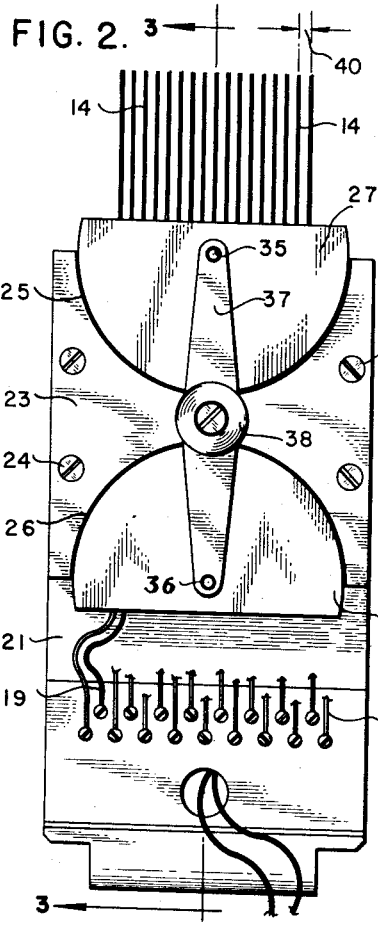
FIG. 2.
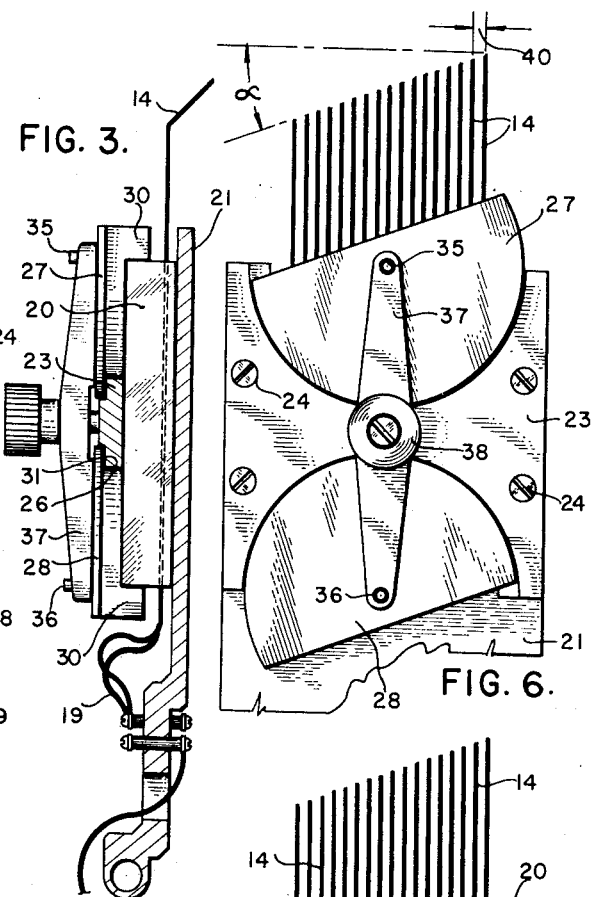
FIG. 3.
FIG. 6.
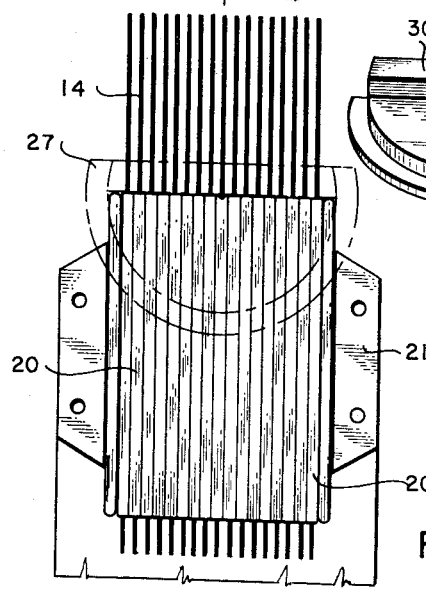
FIG. 5.
FIG. 4.
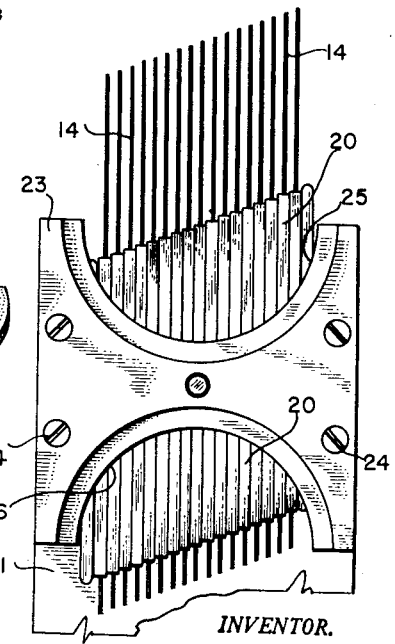
FIG. 7.
INVENTOR.
RICHARD L. MANEVAL,
BY
John L. Schneider
ATTORNEY.

United States Patent Office 2,951,738
Patented Sept. 6, 1960

2,951,738

RECORDING APPARATUS

Richard L. Maneval, Houston, Tex., assignor, by mesne assignments, to Jersey Production Research Company, Tulsa, Okla., a corporation of Delaware Filed Sept. 16, 1959, Ser. No. 840,350

1 Claim. (Cl. 346—139)

This invention concerns improvements in apparatus for recording seismic waves for geophysical exploration work and it particularly concerns the styli supporting head portion of the recording apparatus.

As is well-known in geophysical prospecting, a seismic disturbance is imparted to the earth generally by means of an explosion. Seismic waves generated by the explosion travel downwardly through the subsurface and are reflected back to the surface by subterranean strata. These reflected waves are detected at spaced points on the earth's surface, which points are at selected distances from the explosion point, termed "the shot point." The depth of subsurface reflecting strata can be determined by measuring the time intervals between initiation of the explosion and detection of the reflected waves at the detection point. Various corrections may be made to adjust the arrival time of the reflected waves to compensate, for example, for differences in the elevation of the shot point and the various detecting points and to compensate for the low velocity layer of the earth at the several points.

Electrical signals are generated in response to the seismic wave energy and these signals may be recorded in various ways, such as, photographically or electro-magnetically. An electro-magnetic record is not visual; however, it is readily adapted to reproduction. When such a record is reproduced or played-back, the various time corrections mentioned above may be applied to the signals making up the record. This type record can be repeatedly reproduced.

The reflected waves picked up by any one of the detectors are of varying amplitudes and so the electrical signal put out by the detector is also of varying amplitudes. This signal, when recorded visually in a variable density type presentation, is displayed as a straight line, the density of which varies in proportion to the signal amplitude.

The present invention is particularly concerned with the type presentation wherein the visual recording means preferably is a moving electro-sensitive paper and the recorder is a pen or stylus. A record line is burned into the paper by an electric spark discharge from the pen stylus though the paper to a grounded electrode behind the paper which may be the drum on which the paper is arranged. The electrical signal fed to the pen may be amplified and a signal modifier also may be employed. The signal modifier may full wave rectify the incoming signal or half wave rectify it or produce pulses corresponding to the zero crossing of the signal. Thus, the presentation of the signal on the electro-sensitive paper may be varied depending upon the type signal modifier that operates on the signal fed to the pen or stylus.

The apparatus of the invention is essentially a multi-channel type styli supporting head for use in the burning type record designed such that the plurality of styli are individually replaceable and the styli as a group are adjustable angularly.

Thus, a primary purpose of this invention is to provide an improved styli supporting head for seismic recording apparatus.

This and other objects and advantages of the invention will be more apparent from a detailed description of the invention taken in conjunction with the drawings wherein:

Fig. 2 is a top view of the recording head of the invention;

Fig. 3 is a view taken on lines 3—3 of Fig. 2;

Fig. 4 is a top view of the recording head with portions of the apparatus removed;

Fig. 5 is an isometric inverted view of one of the semi-circular retaining members shown in Fig. 2;

Fig. 6 is a view similar to that shown in Fig. 2 with the styli arranged at an angle to the horizontal; and Fig. 7 is a view similar to that shown in Fig. 6 with a portion of the apparatus removed.

Figure 1:
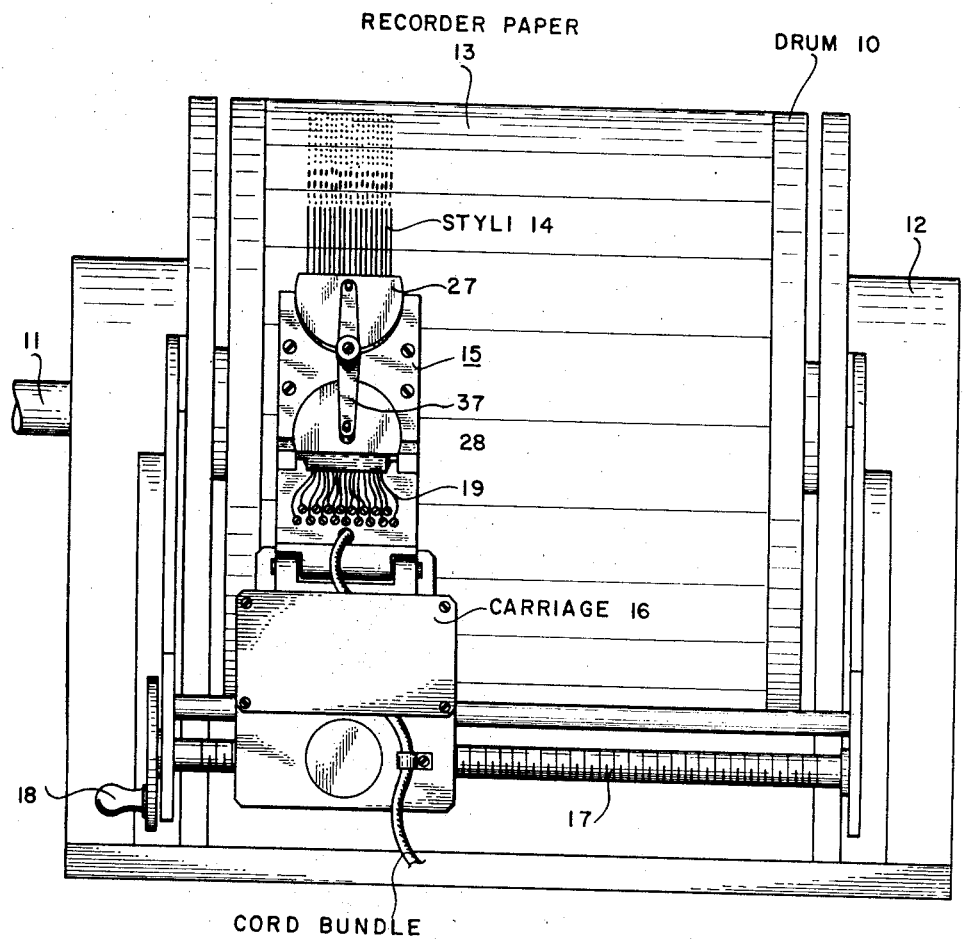
Fig. 1 is a front elevational view of the recording head mounted for movement across the recording medium.

In Fig. 1 is shown a drum 10 mounted for rotation on a shaft 11 and supported on a frame 12. Electro-sensitive recorder paper 13 is arranged on drum 10. The recording styli 14 are arranged on an adjustable supporting head 15 which is supported on a movable carriage 16. A positioning screw 17 provided with a handle 18 is connected to carriage 16 and arranged so that rotation of handle 18 causes carriage 16 and head 15 to move horizontally across the face of drum 10. Electrical signals produced in response to seismic wave energy are transmitted to the styli 14 through conductors 19.

The details of head 14 are shown in Figs. 2 to 7. As seen therein, a plurality of contiguous, parallelly extending insulating strips 20 formed of Bakelite or other insulating material are arranged on a base plate member 21. Each strip 20 is individually removable and has embedded therein and extending therethrough one of the electrically conductive styli 14. A top plate member 23 is arranged on strips 20 and connected to base plate supporting member 21 by means of the four screws 24. Upper and lower semi-circular recesses 25 and 26, respectively, are formed in top plate member 23. Semi-circular retaining members 27 and 28 are arranged in recesses 25 and 26, respectively. One of these retaining members is shown in Fig. 5 in an inverted position. A shoulder 30 formed on the underside of the retaining member engages the edges of the strips. Another shoulder 31 formed on the underside of the retaining member engages the edges of the recesses. Retaining members 27 and 28 are provided with lugs 35 and 36, respectively, which engage a clamp 37 secured to top plate member 23 by means of the knurled nut 38. Lugs 35 and 36 form pivot points for rotation of retaining members 27 and 28, respectively.

When it is desired to replace the styli, screws 24 holding top plate 23 to base member 21 are removed and the top plate and connected parts including retaining members 27 and 28, clamp 37, and knob 38 are lifted from base member 21. As shown in Fig. 4, complete access to all of the strips and styli is obtained through this operation and any one or more of these members can be removed and replaced. Individual removal is possible since each stylus and strip associated therewith is separable from the others. Upon replacement of any stylus, additional adjustment to properly space the styli one from another is not necessary since, as indicated by the arrowed lines 40 in Figs. 2 and 6, the constant width of the strips automatically provide the proper spacing. After the desired styli are replaced, top plate member 23 and retaining members 27 and 28, clamp 37, and knob 38 are replaced and secured to base member 21 by screws 24.

When it is desired to align the styli in any angular direction, as, for example, at an angle α to the horizontal, as seen in Fig. 6, knurled nut 38 is loosened which frees retaining members 27 and 28 for rotative movement. By applying light pressure to the edges of the retaining members, the retainer members are rotated causing the shoulder 30 of each retainer member abutting the edge of the strip adjacent to it to move the strips and cause the styli to align themselves at an angle. In this operation, retaining members 27 and 28 pivot on the pivot points formed by lugs 35 and 36, respectively. The styli can be aligned in any line forming an angle of up to, for example, 30° either way from the horizontal. After placing the styli in the desired position, the knurled nut is screwed down which locks the retaining members 27 and 28 in place. The angular position of the retaining members and associated styli is illustrated in Figs. 6 and 7.

This type tof burning head is advantageous over existing supporting heads in that if a pair of styli accidentally short out or are worn out, they may be replaced in the field without undue expense or down time. The replacement procedure is simple and may be made by any one reasonably familiar with the apparatus. Additionally, under certain circumstances it may be desirable to make the conventional multi-trace seismic recording with the styli aligned in some line other than one directly across the recording so that the resulting traces are displaced with respect to each other. This type alignment of the styli can be made with the apparatus described without changing the space between the adjacent styli and consequently, without changing the space between the final traces.

Having fully described the objects, apparatus, and operation of my invention, I claim:

Apparatus for recording a plurality of seismic signals comprising a base plate supporting member, a plurality of contiguous, parallelly extending insulating strips individually removably arranged on said base member, an electrically conductive stylus embedded in each of said strips and extending beyond the edges thereof, said styli being spaced equal distances one from another, a removable top plate member arranged on said strips, said top plate member having two opposing semi-circular recesses provided therein, a removable semi-circular retainer member arranged for rotative movement in each of said recesses, one having a shoulder engaging with one edge of each of said strips and the other having a shoulder engaging with another edge of each of said strips, whereby rotation of said retainer members change the angular position of said styli, a releasable clamp arranged on said top plate and said retainer members and means for releasably securing said clamp to said top plate member, one end of said clamp being pivotally secured to said one retainer member, the other end of said clamp being pivotally secured to said other retainer member.

No references cited.